United States Patent [19]
Vassalotti

[11] Patent Number: 5,391,032
[45] Date of Patent: Feb. 21, 1995

[54] REUSABLE POSITIVE BOLT LOCKING DEVICE

[76] Inventor: Michael Vassalotti, 2510 Halterbreak Ct., Herndon, Va. 22071

[21] Appl. No.: 141,515

[22] Filed: Oct. 27, 1993

[51] Int. Cl.⁶ .................... F16B 39/04; F16B 39/10; F16B 39/12
[52] U.S. Cl. ................... 411/214; 411/198; 411/226; 411/244
[58] Field of Search .............. 411/197–201, 411/166, 167, 216, 217, 244, 263, 226, 214, 215

[56] References Cited

U.S. PATENT DOCUMENTS

| | | | |
|---|---|---|---|
| 1,241,181 | 9/1917 | Wilhelm | 411/201 |
| 1,376,624 | 5/1921 | Ivory | 411/244 |
| 4,037,980 | 7/1977 | Haentjens | 411/166 X |
| 4,493,597 | 1/1985 | Rolf | 411/198 |

Primary Examiner—Neill R. Wilson
Attorney, Agent, or Firm—Charles J. Brown

[57] ABSTRACT

A reusable positive locking device having a nut threaded onto a bolt shank to a certain closure position wherein a locking element is screwed onto the bolt shank against the nut and a crown element cupped over the end of the bolt shank is screwed onto the bolt shank to engage the locking element and is then given an additional increment of turning so as to elastically deform biasing means between the crown element and its threaded engagement with the bolt shank, thus closing up play among the bolt shank and the locking element and the crown and the nut, the threaded connections between the locking element and the bolt shank and between the the crown element and the bolt shank being of a different direction, and the locking and crown elements being held together against relative rotation by releasable detent means.

17 Claims, 5 Drawing Sheets

REUSABLE POSITIVE BOLT LOCKING DEVICE

BACKGROUND OF THE INVENTION

Locking devices which typically secure nuts in closure positions on bolts against fastened elements have had a long design history. Ideally such devices should be reusable, which is to say in their operation one-time plastic deformation of parts should be avoided. They should not require the fastened element to be retro-fitted, as for example with special locking sockets or cavities. They should achieve their positive locking effect on the nut not merely in a few discrete incremental turned positions of the nut, but precisely in that one of an infinite number of turned positions where the nut is fully closed against the fastened element. Dimensional tolerances cause play among the parts of the locking device and the nut being locked and the design of the device should neutralize that play, not only to insure that the nut remains fully closed against the fastened element but also to prevent vibration from further loosening the parts.

No prior art bolt locking device meets all of these criteria. For example U.S. Pat. Nos. 619,137, 851,964, 995,058, 1,005,727, 1,098,790, 1,181,043, 1,967,237, 2,016,000 and 2,203,219 are all examples of locking devices which positively lock a nut in a limited number of its incremental turned positions. A special retro-fitted socket or cavity is required in the fastened element in the designs of U.S. Pat. Nos. 851,964 and 1,098,790. Permanent deformation of parts preventing re-use is inherent in U.S. Pat. Nos. 619,137 and 1,967,237. None of these prior art references suggests a design specifically addressing neutralization of play among the parts of the locking assembly.

It is the principal object of this invention to combine elastically deformable biasing means with infinitely variable positive detent locking means so as to avoid plastic deformation of parts or special retro-fitting of the fastened element or elements and to achieve positive locking in an infinite number of turned positions of a nut and neutralization of play among the parts of the device.

SUMMARY OF THE INVENTION

The invention provides a reusable positive locking device for a bolt shank end portion having threads of a certain first direction. The device includes a locking element internally threaded so as to be screwed onto the shank end portion with threads of the same first direction. A crown element is provided which is of generally cup shape and which has a rim positionable around the shank end portion. Elastically deformable biasing means are fixed at one end to the inside of the crown element and are threadable at the opposite end to the projecting shank end portion, with threads of a direction opposite the first direction. Thus upon turning of the crown element its rim engages the locking element and with an additional increment of turning the biasing means strains elastically to close up play among the shank end portion and the crown and locking elements. Releasable detent means are also included for selectively securing the locking and crown elements together against relative rotation when the biasing means is in its elastically strained condition, thus preventing rotation of both on the shank end portion.

In a preferred form of the biasing means a longitudinal tensioning post extends axially from the inside of the crown element and is threaded about its end portion, with threads of the opposite direction, for threadable engagement within a correspondingly internally threaded axial hole in the shank end portion.

The locking element may also be generally of cup shape and if so the crown element may be reversed inside of and rotatable within the locking element. The locking element may include an annular base threadable onto the projecting shank portion and the rim of the crown element may engage the inside of the annular base.

The detent means may comprise a circular array of equally spaced half-grooves on that surface of the locking element which rotates against the crown element, and a circular array of equally spaced matching half-grooves on that surface of the crown element which rotates against the locking element. The grooves on the locking element are of a different number, preferably one more, than the grooves on the crown element. The aforementioned additional increment of turning of the crown element causes one of its grooves to be aligned with one of the grooves on the locking element as a pair to form a seat. A locking pin is insertable in the seat formed by the aligned pair to prevent relative rotation of the locking element and crown element. The locking pin may include a handle portion for releasably retaining the pin in its inserted position.

The half-grooves of this form of detent means may be semi-circular so that the seat formed by the aligned pair of grooves is circular, and the locking pin then is of corresponding circular cross-section.

The invention also includes the subcombination of the above-described releasable detent means in any reusable positive locking device for a nut threaded onto a bolt wherein a locking element is screwed against the nut to hold the nut in a closure position and a crown element is rotatable against the locking element, the releasable detent means serving to selectively secure the locking and crown elements together against relative rotation.

The bolt shank end portion may have threaded onto it a nut against which the locking element of the device of the invention is tightened to hold the nut in a closure position.

DESCRIPTION OF PREFERRED EMBODIMENT

In this embodiment the reusable positive locking device of the invention holds a nut 10 in a certain closure position threaded onto a bolt shank 11 with threads of a certain first direction, pitch or lead with a shank end portion 12 projecting from the nut 10. As used herein "direction" means the clockwise or counter clockwise rotation of the threaded part causing it to advance or withdraw, "pitch" is the distance from one thread to the next measured axially and "lead" is the axial advance resulting from one complete turn of the threaded part. For purposes of illustration the bolt shank 11 may be of a nominal three-quarter inch diameter with ten threads per inch.

A locking element 14 of generally cup shape includes an annular base 15 which is internally threaded to be screwed onto the projecting shank end portion 12 with matching threads of the same direction, pitch and lead as the threads on the bolt shank 11. The locking element 14 is turned down on the shank end portion 12 against the nut 10 to hold the nut in its closed position, usually against some fastened element (not shown) such as a flange through which the bolt shank 11 may extend. A crown element 17 is provided which is also of generally cup shape and sized to fit telescopically within the cup-shaped locking element 14. As shown particularly in FIG. 2 the crown element is reversed inside of the locking element 14 so that a circular rim 18 of the crown element 17 is positionable coaxially around the projecting shank end portion 12.

Figure 1:
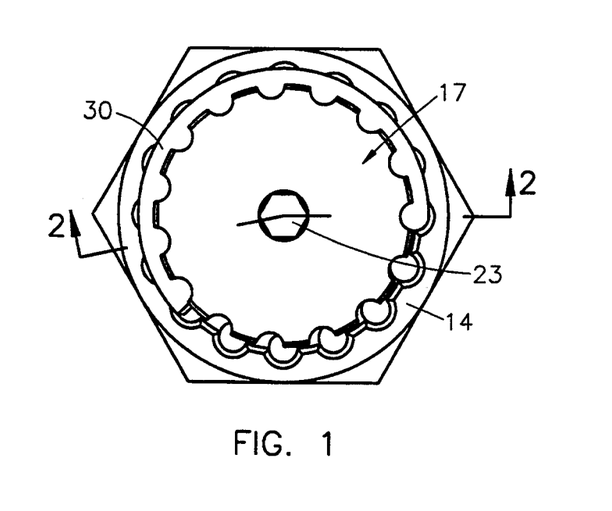
FIG. 1 is a plan view of the locking device of the invention looking down on the top of the crown element.
Figure 2:
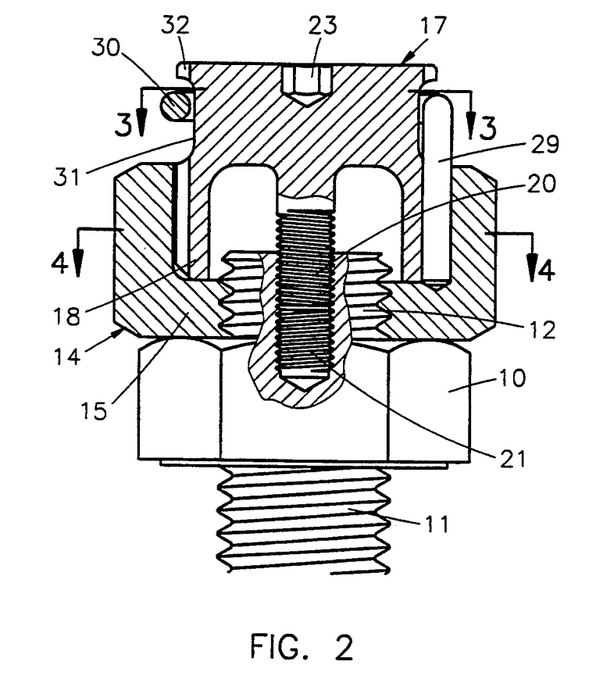
FIG. 2 is an elevation, mainly in section taken along the line 2—2 of FIG. 1 and partly broken away, of the locking device of the invention fully assembled on a bolt shank.
Figure 8:
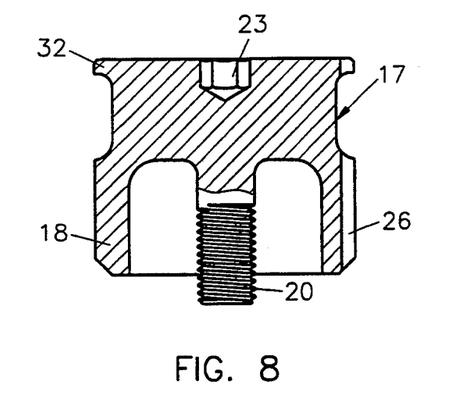
FIG. 8 a longitudinal section taken along the line 8—8 of FIG. 7.

Elastically deformable biasing means are included in the locking device of the invention, and in this embodiment that comprises a longitudinal tensioning post 20 extending integrally and axially from the inside of the crown element. The tensioning post 20 is externally threaded as shown in FIGS. 2 and 8 with threads which are different from the threads on the bolt shank 11 and within the annular base 15 of the locking element 14. Specifically the threads on the tensioning post 20 are of a different direction, and also of a different pitch or lead as well if desired, as compared to the threads on the bolt shank 11 and the locking element 14. The tensioning post 20 is in threadable engagement within a correspondingly internally threaded axial blind hole 21 formed in the extremity of the shank end portion 12.

Upon turning of the crown element 17 the post 20 advances into the hole 21 until the rim 18 of the crown element 17 engages the annular base 15 of the locking element 14 in metal-to-metal contact. To facilitate this turning, an axial socket 23 is provided on the outer end of the crown element 17 remote from the tensioning post 20 permitting torque to be applied to the crown element 17 by a conventional wrench. It will be apparent that if the crown element 17 is further torqued after its rim 18 engages the annular base 15 of the locking element 14, tension will be imposed upon the post 20 because its lower end is held fast by its threaded connection with the threaded hole 21 in the shank end portion 12. As such additional torquing of the crown element 17 takes place, the additional increment of turning of the tensioning post 20 stretches it elastically, which is to say imposes strain on the post 20 within its yield point. This creates a spring-like bias within the parts of the locking device closing up play among the shank end portion 12 and the locking element 14 and the crown element 17 and the nut 10.

With the tensioning post 20 stretched elastically as described above and with play taken up among the parts of the assembly, locking is to be completed by preventing relative rotation of the locking element 14 and the crown element 17. This is achieved by releasable detent means which includes a circular array, for example sixteen, of longitudinal equally spaced parallel outside semi-circular grooves 25 on the inside of the cup-shaped locking element 14. There is also a circular array of longitudinal equally spaced parallel inside matching semi-circular grooves 26 on the outside of the cup-shaped crown element 17. In this embodiment the number of inside grooves 26 is fifteen, so that the number of outside grooves is one more than the number of inside grooves. It will be apparent that there is a calculable upper limit to the maximum angular rotation required of the crown element 17 with respect to the locking element 15 to bring one of the outside grooves 25 in exact alignment with one of the inside grooves 26 so that together they form a seat of circular cross-section. This maximum angle is $$360° \times \frac{16 - 15}{15 \times 16} = 360° \times \frac{1}{240} = 1.5°$$

Figure 3:
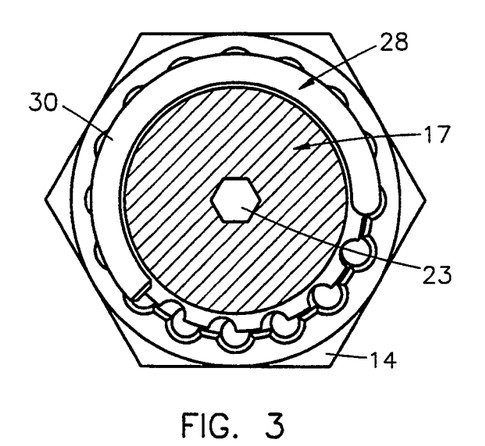
FIG. 3 is a lateral section taken along the line 3—3 of FIG. 2.
Figure 4:
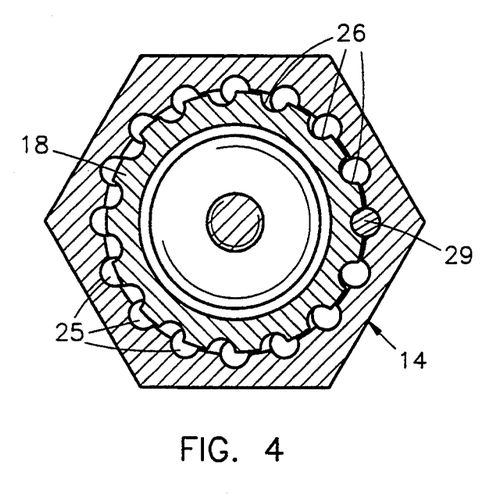
FIG. 4 is a lateral section taken along the line 4—4 of FIG. 2.
Figure 5:
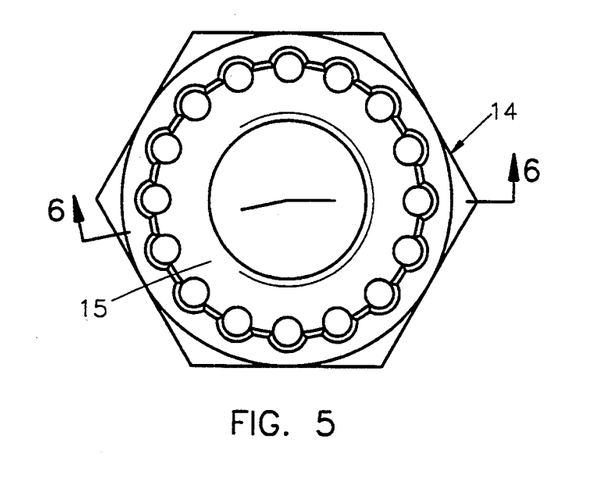
FIG. 5 is a plan view of the locking element of the invention.
Figure 6:
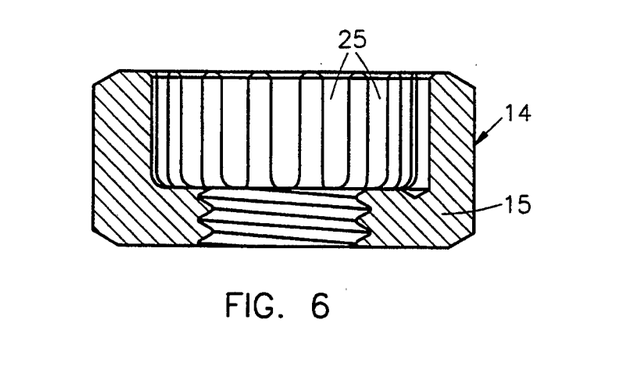
FIG. 6 is a longitudinal section taken along the line 6—6 of FIG. 5.
Figure 7:
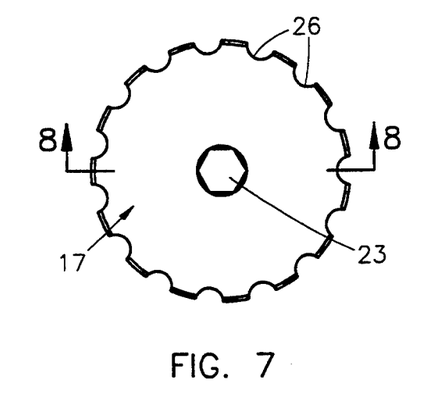
FIG. 7 is a plan view of the crown element of the invention.
Figure 9A:
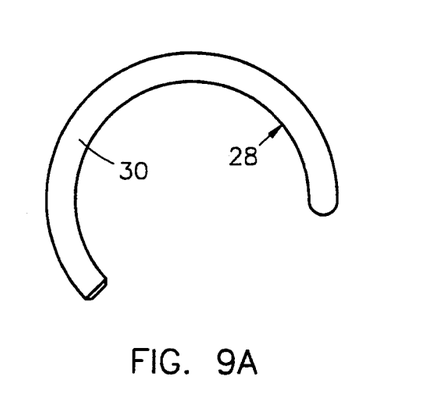
FIGS. 9A, 9B and 9C are plan and side views of the locking pin of the invention.
Figure 9B:
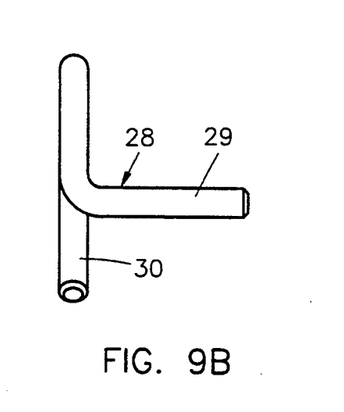
Figure 9C:
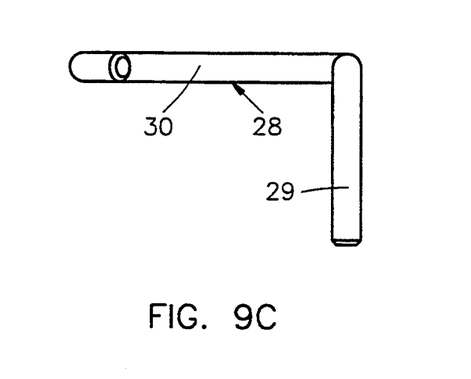

The additional slight incremental rotation of the crown element 17 referred to previously which elastically stretches the tensioning post 20 brings a pair of the outside and inside grooves 25 and 26 into alignment. When that happens a locking pin 28 shown in FIGS. 9A to C is dropped into the circular seat formed by the aligned grooves. The pin 28 includes an insert end 29 which enters the circular seat and an arcuate handle portion 30 which can be disposed around a throat 31 of the crown element 17 when the device is assembled. When the insert portion 29 of the pin 28 is in place in a pair of the aligned grooves 25 and 26, as for example the groove at "three o'clock" as seen in FIG. 3, it is impossible to rotate the crown element 17 within and with respect to the locking element 14 in either direction.

The handle portion 30 of the pin 28 describes an arc slightly greater than 180° with an inside diameter substantially equal to the diameter of a throat 31 of the crown element 17, so that the handle portion may open somewhat to snap resiliently about the throat 31 and be retained from swinging off the crown element. A rim 32 defining the upper end of the throat 31 prevents the insert portion from sliding axially out of the aligned pair of grooves 25 and 26 when the arcuate handle portion 30 is snapped in place about the throat 31.

It will be understood that for every 1.5° of turning of the crown element 17 another pair of outside and inside grooves 25 and 26 will come into alignment. It is preferred that locking be performed on the second or perhaps third consecutive alignment positions. To do it on the first alignment position may not create sufficient biasing within the assembly and to lock after more than three groove alignments may excessively strain the tensioning post 20.

To summarize the operation of this embodiment of the locking device of the invention, the nut 10 is first threaded in a first direction onto the bolt shank 11 and tightened to required torque in its closure position. The locking element 14 is then threaded down onto the projecting end portion 12 of the bolt shank 11 and slightly tightened until it comes into metal-to-metal contact with the nut 10 and all play in the nut is taken up. The tensioning post 20 of the crown element 17 is then threaded into the threaded hole 21 in the end portion 12 of the bolt shank 11, by turning in a direction opposite the first direction, until the rim 18 of the crown element 17 bottoms against the annular base 15 of the locking element 14. An additional increment of turning of the crown element 17 by means of a wrench within the socket 23 causes the tensioning post 20 to stretch elastically thus achieving two effects. The first is that play is closed up among the shank end portion 12 and the locking element 14 and the crown element 17 and the nut 10. The second is that two of the half-grooves 25 and 26 are thus brought into alignment to form a circular seat. The insert element 29 of the pin 28 is then thrust into that seat and the handle of the pin 28 is swung around into closed position about the top of the crown element 17. To distribute the biasing throughout the assembly and to take up all play among the pin, crown element and locking element it is useful to apply a quick backing-off torque to the crown element 17 after the locking pin 28 is in place.

Locking is thus complete. No plastic deformation of any parts has occurred. Therefore the pin may be removed by first swinging the handle portion 30 from the throat 31 of the crown element 17 and then sliding the insert portion 29 axially out of the aligned grooves 25 and 26. The tensioning post 20 of the crown element 17 may then be unscrewed from the threaded hole 21 on the projecting end 12 of the bolt shank 11, and the locking element 14 unscrewed from the end of the bolt shank end portion 12, and the entire disassembled locking device is ready for reuse. This can be repeated an unlimited number of times. No retro-fitting of any fastened element is required. Very importantly the positive locking effect on the nut 10 is precisely in that one of an infinite number of turned positions of the nut where it is in its fully closed and tightened position against whatever fastened element may be involved. Finally, all play is taken up among the parts. Thus all advantages of an ideal locking device mentioned earlier is achieved.

It will be evident that variations can be made in this particular embodiment of the locking device of the invention and still achieve all of these advantages. For example, instead of forming an internally threaded axial hole on the projecting end portion 12 of the bolt shank 11, such as the hole 21, an outer extreme end portion of the bolt shank may be externally threaded with threads which are different in pitch or lead or direction as compared to the threads on the bolt shank onto which the nut 10 is screwed. Then, instead of a tensioning post 20 extending axially from the crown element 17, a correspondingly internally threaded tensioning cylinder or segments of a cylinder may project downwardly onto this differently threaded outer extremity of the bolt shank.

Alternatively, that cylinder may be enlarged so as to be spaced concentrically from the threaded shank extremity and tabs may extend radially from that enlarged cylinder into threaded engagement with that differently threaded extremity of the end portion of the bolt shank. With that modification the additional increment of turning of the crown element after its rim bottoms against the annular base of the locking element causes the tabs to bend up elastically and thereby perform all of the desired functions of the biasing means.

Another variation within the scope of the invention involves changing the locking element 14 from the illustrated cup-shaped form to a flat form much like an ordinary nut. The rim portion 18 of the crown element 17 would then engage the upper flat periphery of that nut-shaped locking element. The detent grooves would then be radial in those flat surfaces of the locking element and the crown element which would rotate against one another as the biasing means is elastically strained.

Yet another modification within the scope of the invention is to eliminate the nut 10. In effect locking element 14 is combined with the nut to form a unitary locking element longer than that shown which is secured to the end of the bolt shank 11 in one locked position when used with the crown element 17 and locking pin 28 as described. In this modified form the enlarged locking element may be tightened directly against any fastened part or may simply be held locked by itself on the end of a threaded bolt shank end portion.

The scope of the invention therefore is to be determined from the following claims rather than from the specific form of the particular embodiment described above.

I claim:

1. A reusable positive locking device for a bolt shank end portion having threads of a certain first direction comprising
   a) a locking element internally threaded to be screwed onto the shank end portion with threads of said first direction,
   b) a crown element of generally cup shape having a rim positionable around the shank end portion,
   c) elastically deformable biasing means fixed at one end to the inside of the crown element and threadable at its opposite end to the shank end portion with threads of a direction opposite said first direction so that upon turning of the crown element its rim engages the locking element and with an additional increment of turning the biasing means strains elastically to close up play among the shank end portion and the crown and locking elements, and
   d) releasable detent means for selectively securing the locking and crown elements together against relative rotation when the biasing means is in said elastically strained condition thus preventing rotation of both on the shank end portion.

2. A locking device according to claim 1 wherein the biasing means is a longitudinal tensioning post extending axially from the inside of the crown element and threaded about its end portion with threads of said opposite direction for threadable engagement within a correspondingly internally threaded axial hole in the shank end portion.

3. A locking device according to claim 1 wherein said detent means comprises a circular array of equally spaced half-grooves on that surface of the locking element which rotates against the crown element, a circular array of equally spaced matching half-grooves on that surface of the crown element which rotates against the locking element, the grooves on the locking element being of a different number than the grooves on the crown element, said additional increment of turning of the crown element causing one of its grooves to be aligned with one of the grooves on the locking element as a pair to form a seat, and a locking pin insertable in the seat formed by the aligned pair to prevent relative rotation of the locking element and crown element.

4. A locking device according to claim 1 wherein the locking element is also generally of cup shape and the crown element is reversed inside of and rotatable within the locking element, and the locking element includes an annular base threadable onto the shank portion, the rim of the crown element engaging the inside of said annular base.

5. A locking device according to claim 4 wherein said detent means comprises a circular array of longitudinal equally spaced parallel outside half-grooves on the inside of the cup-shaped locking element, a circular array of longitudinal equally spaced parallel inside matching half-grooves on the outside of the cup-shaped crown element, the outside grooves and the inside grooves being of different numbers, said additional increment of turning of the crown element causing one of the outside grooves to be aligned with one of the inside grooves as a pair to form a seat, and a locking pin insertable in the seat formed by the aligned pair to prevent relative rotation of the locking element and crown element.

6. A locking device according to claim 5 wherein the half-grooves are semi-circular, the seat formed by the aligned pair of grooves is circular, and the locking pin is of corresponding circular cross-section.

7. A locking device according to claim 5 wherein the number of outside grooves is one more than the number of inside grooves.

8. A locking device according to claim 5 wherein the locking pin includes a handle portion for releasably retaining the pin in its inserted position.

9. A locking device according to claim 1 wherein a nut is threaded onto the shank portion and the locking element is tightened against the nut to hold the nut in a closure position.

10. A reusable positive locking device for a nut threaded onto a bolt shank with threads of a certain first direction to a certain closure position with a shank end portion projecting from the nut comprising
   a) a locking element of generally cup shape including an annular base internally threaded to be screwed onto the projecting shank end portion with threads of said first direction against the nut to hold the nut in its closed position;
   b) a crown element of generally cup shape reversed inside of and rotatable within the locking element and having a circular rim positionable coaxially around the projecting shank end portion;
   c) elastically deformable biasing means comprising a longitudinal tensioning post extending integrally and axially from the inside of the crown element and externally threaded about its end portion with threads of a direction opposite said first direction for threadable engagement within a correspondingly internally threaded axial hole in the shank end portion so that upon turning of the crown element its rim engages the annular base of the locking element and with an additional increment of turning the tensioning post stretches elastically to close up play among the shank end portion and the locking and crown and locking elements; and
   d) releasable detent means comprising
      i. a circular array of longitudinal equally spaced parallel outside half-grooves on the inside of the cup-shaped locking element,
      ii. a circular array of longitudinal equally spaced parallel inside matching half-grooves on the outside of the cup-shaped crown element,
      iii. the number of outside grooves being one more than the number of inside grooves,
      iv. said additional increment of turning of the crown element causing one of the outside grooves to be aligned with one of the inside grooves as a pair to form a seat, and
      v. a locking pin insertable in the seat formed by the aligned pair to prevent relative rotation of the locking element and crown element.

11. A locking device according to claim 10 wherein the locking pin includes a handle portion for releasably retaining the pin in its inserted position.

12. In a reusable positive locking device wherein a locking element is screwed onto a bolt shank end portion and a crown element is coaxially rotatable against the locking element, releasable detent means for selectively securing the locking and crown elements together against relative rotation comprising
   a) a circular array of equally spaced half-grooves on that surface of the locking element which rotates against the crown element,
   b) a circular array of equally spaced matching half-grooves on that surface of the crown element which rotates against the locking element,
   c) the grooves on the locking element being of different number than the grooves on the crown element,
   d) whereby turning of the crown element causes one of its grooves to be aligned with one of the grooves on the locking element as a pair to form a seat, and
   e) a locking pin insertable in the seat formed by the aligned pair to prevent relative rotation of the locking element and crown element.

13. A locking device according to claim 12 wherein the locking pin includes a handle portion for releasably retaining the pin in its inserted position.

14. In a reusable positive locking device wherein a locking element of generally cup-shape is screwed onto a bolt shank end portion and a crown element of generally cup shape is also screwed onto the bolt shank end portion and is reversed inside of and rotatable within the locking element, releasable detent means for selectively securing the locking and crown elements together against relative rotation comprising
   a) a circular array of longitudinal equally spaced parallel outside half-grooves on the inside of the cup-shaped locking element,
   b) a circular array of longitudinal equally spaced parallel inside matching half-grooves on the outside of the cup-shaped crown element,
   c) the outside grooves and the inside grooves being of different numbers,
   d) whereby turning of the crown element causes one of the outside grooves to be aligned with one of the inside grooves as a pair to form a seat, and
   e) a locking pin insertable in the seat formed by the aligned pair to prevent relative rotation of the locking element and crown element.

15. A locking device according to claim 14 wherein the locking pin includes a handle portion for releasably retaining the pin in its inserted position.

16. A locking device according to claim 14 wherein the number of outside grooves is one more than the number of inside grooves.

17. A reusable positive locking device for a bolt shank end portion having threads of a certain first direction and pitch and lead comprising
   a) a locking element internally threaded to be screwed onto the shank end portion with threads of said first direction, and pitch and lead
   b) a crown element of generally cup shape having a rim positionable around the shank end portion, c) elastically deformable biasing means fixed at one end to the inside of the crown element and threadable at its opposite end to the shank end portion with threads different in at least one of direction and pitch and lead from said first direction and pitch and lead so that upon turning of the crown element its rim engages the locking element and with an additional increment of turning the biasing means strains elastically to close up play among the shank end portion and the crown and locking elements, and d) releasable detent means for selectively securing the locking and crown elements together against relative rotation when the biasing means is in said elastically strained condition thus preventing rotation of both on the shank end portion.

* * * * *